(12) United States Patent
Atwood et al.

(10) Patent No.: US 9,038,871 B2
(45) Date of Patent: May 26, 2015

(54) GLOVE CONSTRUCTION AND KIT FOR CARRYING OUTFITTED ELECTRONIC DEVICES

(76) Inventors: Kevin T. Atwood, Des Plaines, IL (US); Jennifer M. Atwood, Des Plaines, IL (US)

(*) Notice: Subject to any disclaimer, the term of this patent is extended or adjusted under 35 U.S.C. 154(b) by 231 days.

(21) Appl. No.: 13/385,506

(22) Filed: Feb. 23, 2012

(65) Prior Publication Data

US 2013/0219584 A1    Aug. 29, 2013

(51) Int. Cl.
*A41D 19/00* (2006.01)
*G06F 1/16* (2006.01)

(52) U.S. Cl.
CPC ....... *G06F 1/1613* (2013.01); *A45F 2200/0525* (2013.01); *Y10S 224/93* (2013.01)

(58) Field of Classification Search
CPC .............................................. A45F 2200/0525
USPC ........ 224/217, 218, 930; 361/679.03, 679.59; 455/575.6; 294/138–139; 2/160
See application file for complete search history.

(56) References Cited

U.S. PATENT DOCUMENTS

| | | | |
|---|---|---|---|
| 2,071,365 A * | 2/1937 | Stroop | 15/104.94 |
| 4,202,139 A * | 5/1980 | Hong et al. | 451/524 |
| 4,754,499 A * | 7/1988 | Pirie | 2/20 |
| 5,283,862 A | 2/1994 | Lund | |
| 5,444,462 A | 8/1995 | Wambach | |
| 5,507,649 A | 4/1996 | Troudet | |
| 5,571,020 A | 11/1996 | Troudet | |
| 5,581,484 A | 12/1996 | Prince | |
| 5,931,297 A | 8/1999 | Weill et al. | |
| 6,141,643 A | 10/2000 | Harmon | |
| 6,149,001 A | 11/2000 | Akins | |
| 6,707,447 B1 | 3/2004 | Goranowski | |
| 6,708,136 B1 * | 3/2004 | Lahiff | 702/177 |
| 6,870,526 B2 | 3/2005 | Zugf et al. | |
| 6,967,596 B2 | 11/2005 | Nguyen | |
| 7,205,979 B2 | 4/2007 | Zimmerman et al. | |
| 7,737,942 B2 | 6/2010 | Bajramovic | |
| 8,480,144 B2 * | 7/2013 | Potter et al. | 294/25 |
| 8,528,798 B2 * | 9/2013 | Chen | 224/217 |
| 2003/0054923 A1 | 3/2003 | Brassil et al. | |
| 2006/0029914 A1 | 2/2006 | Dietrick et al. | |
| 2008/0126925 A1 | 5/2008 | Haven | |
| 2010/0222118 A1 * | 9/2010 | Interdanato | 455/575.6 |
| 2011/0309117 A1 * | 12/2011 | Roberts | 224/217 |
| 2012/0031937 A1 * | 2/2012 | Baker | 224/217 |

* cited by examiner

*Primary Examiner* — Justin Larson
*Assistant Examiner* — Phillip Schmidt
(74) *Attorney, Agent, or Firm* — Meroni & Meroni, P.C.; Charles F. Meroni, Jr.; Christopher J. Scott

(57) ABSTRACT

A glove construction and/or kit may be used to outfit an electronic device so that the user thereof may more easily carry or transport the device. The glove construction comprises a flexible, load-bearing, strap-like material member having a glove length and a glove width. A series of finger-receiving sleeves extend widthwise intermediate the glove length. The ends of the material member are outfitted with a first set of fasteners matable with a second set of fasteners outfitted upon the electronic device. The first and second sets of fasteners are matable and together form a fastener interface for removably attaching the glove construction to the electronic device. The glove construction and the fastener interface are supportable of the device weight, and thus enable the user to manually carry the electronic device via the glove construction by inserting a series of fingers into the finger-receiving sleeves and lifting the combination therewith.

18 Claims, 9 Drawing Sheets

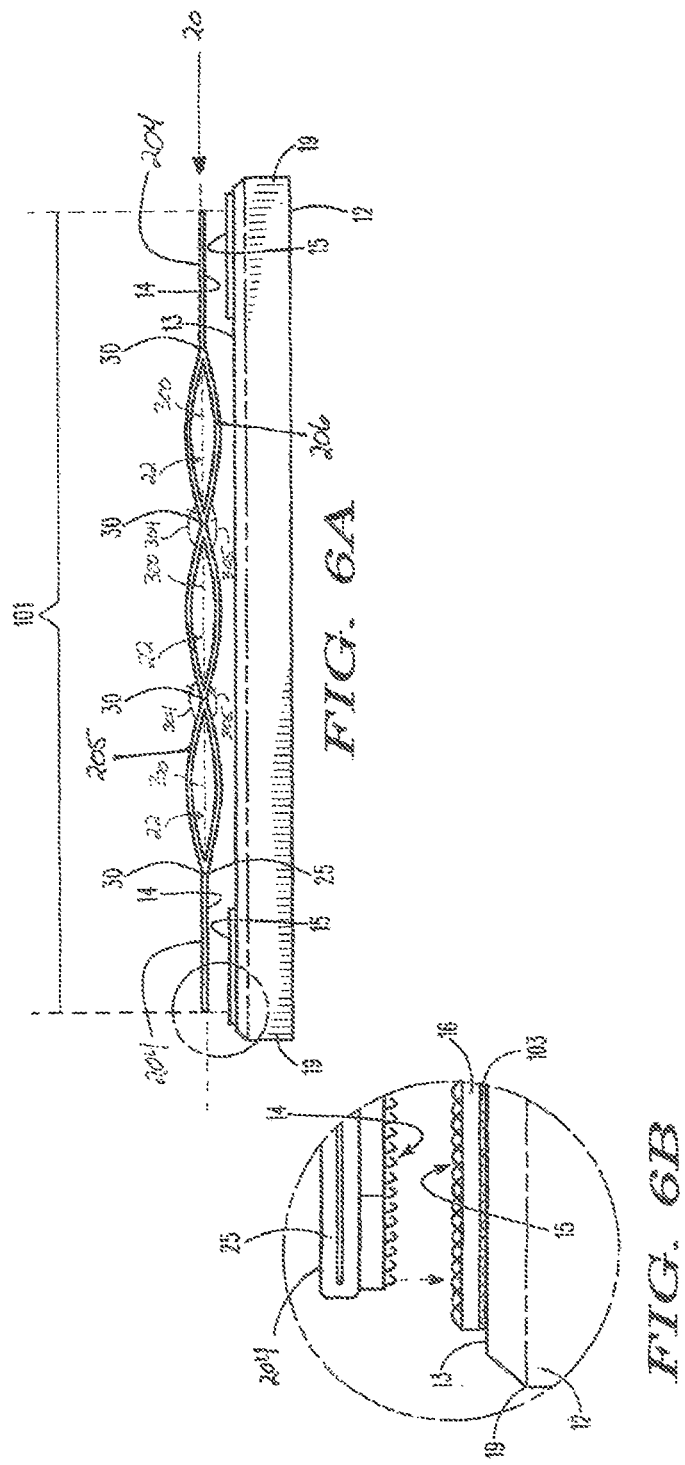

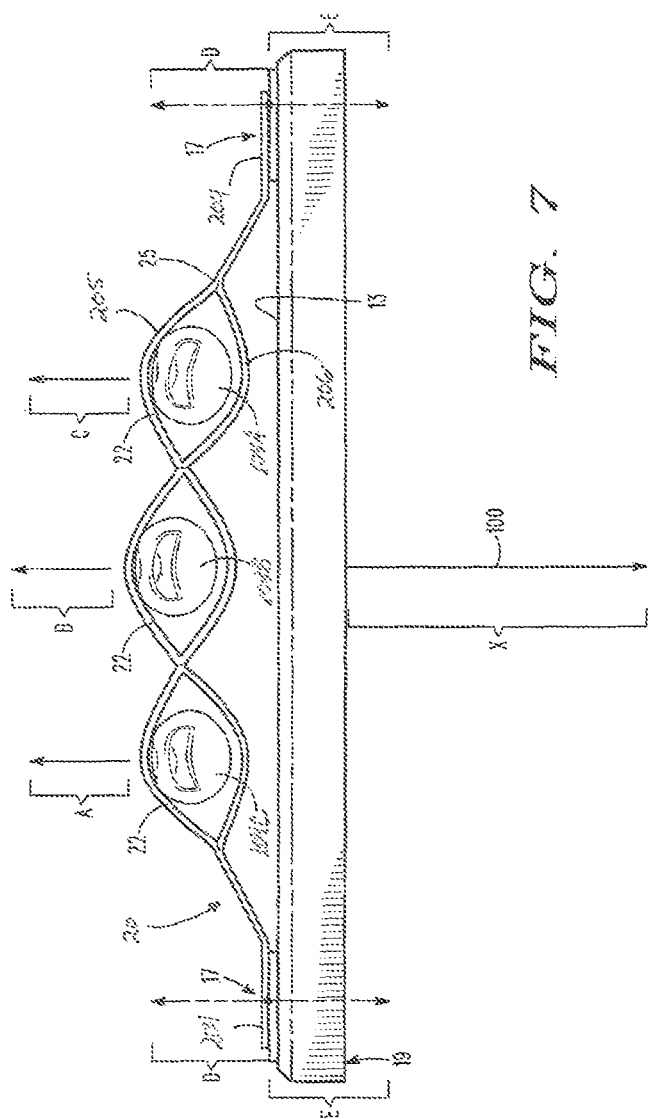

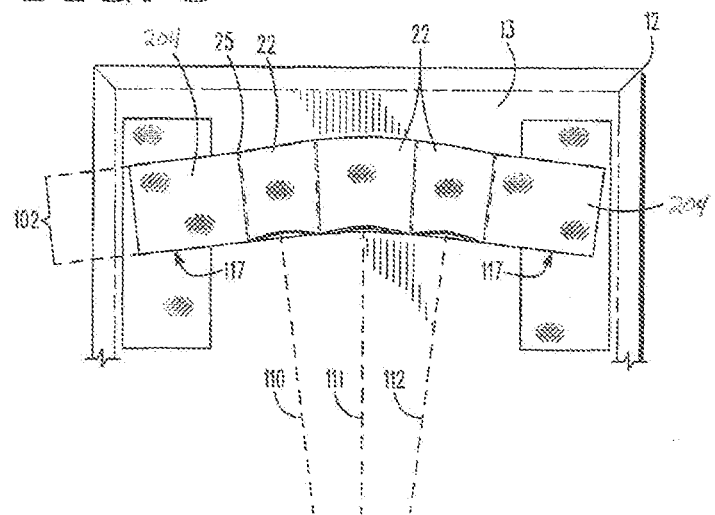
FIG. 8
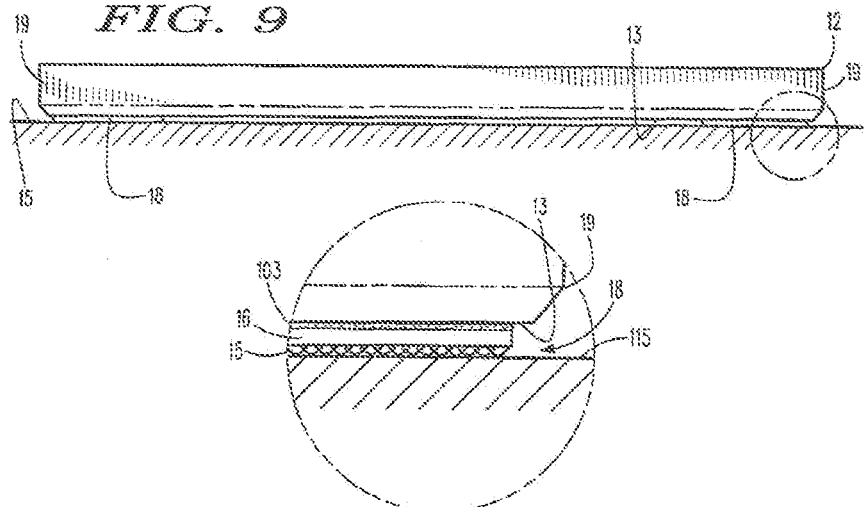
FIG. 9
FIG. 9(a)

GLOVE CONSTRUCTION AND KIT FOR CARRYING OUTFITTED ELECTRONIC DEVICES

BACKGROUND OF THE INVENTION

1. Field of the Invention

The present invention generally relates to device for interfacing between a user's hand and an electronic device. More particularly, the present invention relates to a glove construction, outfittable upon an electronic device so as to enable users thereof to more easily carry the outfitted electronic device.

2. Description of Prior Art

U.S. Pat. No. 5,283,862 ('862 Patent), which issued to Lund, discloses a Notebook Computer with Reversible Cover for External Use of Membrane Switch Screen. The '862 Patent describes a notebook computer unit formed by a base housing and a hinged cover panel has a conventional keyboard mounted on the base housing, a flat panel display device mounted on the cover panel, and a transparent membrane switch array overlayed on the display.

The unit includes a separable and reversible hinge mechanism and a separable and reversible electrical connector assembly which allow the cover panel to be detached, reversed, and re-attached to place the unit in one of two configurations. In one configuration, the display and tactile membrane switch array face outwardly with the cover panel overlying the base for operation of the unit by viewing the display and touching the membrane switch array to enter data and select options displayed. Alternatively, the cover panel may be oriented with the display generally facing the standard keyboard for use of the unit as a conventional notebook type computer.

U.S. Pat. No. 5,931,297 ('297 Patent), which issued to Weill et al, discloses a Notebook Computer Protective Cover. The '297 Patent describes a glove-like protective cover capable of encasing a notebook computer, thereby allowing it to be used in a hostile operating environment, such as outdoors or at a manufacturing site, without risk of debris and moisture reaching the computer and detrimentally affecting its performance. The protective cover includes a top pocket capable of having the screen section of the notebook computer inserted therein, and a bottom pocket capable of having the keyboard section of the computer inserted therein. In this way, the notebook computer can be placed in its open, operating position while encased in the protective cover.

The portions of the cover overlying the screen and keyboard sections of the computer are transparent. Thus, an operator is able to see the screen and keyboard of the notebook computer through the protective cover. Further, the portion of the cover overlying the keyboard of the computer is flexible so as to allow the keyboard to be operated through the cover. The protective cover may also employ a shock absorbing apparatus capable of protecting the notebook computer from damage caused by impacts with other objects during transit or while in use.

U.S. Pat. No. 6,149,001 ('001 Patent), which issued to Akins, discloses a Cover for a Laptop or Notebook Computer. The '001 Patent describes a cover for a portable computer is a thin flexible material adapted to fit closely over the computer like a glove. The cover has cut-outs for the keyboard, screen, controls, ports, etc. of the computer so that the cover does not interfere with convenient use of the computer.

The cover is compact and adds little additional volume or weight to the computer, while protecting the computer housing or case, providing an attractive appearance and also providing convenient accessories, such as pockets for a power supply cord, floppy disks, CD ROM disks, pencils, etc. The computer may be carried or used with the cover installed.

U.S. Pat. No. 6,870,526 ('526 Patent), which issued to Zugf et al., discloses a Glove Mouse with Virtual Tracking Ball. The '526 Patent describes a glove-like apparatus mounted on a user's hand to control the cursor movement and to click for providing functions of a computer mouse. The apparatus has a glove-like body with multiple finger tubes. A tilt sensor is mounted on the glove metacarpus, of which the roll angle of the hand is detected to determine the moving orientation of the cursor.

Two pairs of bending sensors are mounted on the thumb tube and the index finger tube, each pair of the sensors is used to detect a bending angle of the corresponding finger. The bending of the thumb or the index finger at a time is used to move the cursor in the negative or the positive direction along the located orientation line. The data glove for cursor control is operated as a virtual mouse with a virtual tracking ball.

United States Patent Application Publication No. US 2006/0029914, which was authored by Dietrick et al. teaches a device for and a method of teaching keyboarding skills, called a KEYBOARD RIGHT GLOVE AND METHOD are disclosed that relate to the field of educational and teaching devices and methods. More particularly the disclosure relates to a glove-like device used with other visual, audio, and video devices.

These devices are used in a unique method (process or manner) of training and educating various age groups in the skills and use of a keyboard used with computer systems. In this age of rapid technological progress, all age groups, young and old, are faced with a need to be proficient in the use of keyboards for data entry and information exchange. This KEYBOARD RIGHT GLOVE AND METHOD addresses this need.

It will be seen from an inspection of the prior art that the prior art perceives a need for a hand-wearable glove construction that functions to interface intermediate a user's hand and an electronic device so as to enable the wearer of the glove construction to more easily carry or transfer the electronic device.

SUMMARY OF THE INVENTION

To achieve these and other readily apparent objectives, the present invention essentially provides a glove construction and/or kit may be used to outfit an electronic device, such as a laptop computer, tablet, or e-reader, so that the user thereof may more easily carry or transport the device. The glove construction comprises a flexible, load-bearing, strap-like material member having a glove length and a glove width. A series of finger-receiving sleeves extend widthwise intermediate the glove length.

The ends of the material member are outfitted with a first set of fasteners matable with a second set of fasteners outfitted upon the electronic device. The first and second sets of fasteners are matable and together form a fastener interface for removably attaching the glove construction to the electronic device. The glove construction and the fastener interface are supportable of the device weight, and thus enable the user to manually carry the electronic device via the glove construction by inserting a series of fingers into the finger-receiving sleeves and lifting the combination therewith.

The series of finger-receiving sleeves preferably number three such that the three finger-receiving sleeves function to receive the user's index finger, the user's middle finger, and the user's ring finger, thereby leaving the user's thumb and small finger outside the glove. The glove ends effectively function to interface intermediate the user's thumb and small finger and the electronic device.

The glove construction may be easily formed doubling over an elongate load-bearing strap-like material, and forming the finger-receiving sleeves by fastening opposed sections of the material member together widthwise. The glove construction may thus be said to preferably comprise a double-layered material member with finger-receiving sleeves, each of which preferably further define a finger-receiving axis, the finger-receiving axes being non-parallel for ergonomic enhancement.

BRIEF DESCRIPTION OF THE DRAWINGS

Other features of our invention will become more evident from a consideration of the following brief description of patent drawings:

FIG. 6(a) is an edge view of a generic electronic device with the glove construction according to the present invention exploded from a first set of fastening structures attached to the electronic device.

FIG. 6(b) is an enlarged, fragmentary sectional view as sectioned from FIG. 6(a) to show in more detail the fasteners at a glove-to-device junction site.

FIG. 7 is a diagrammatic edge view type depiction of a user's fingers supporting a generic electronic device outfitted with the glove construction according to the present invention to show various simplistic force diagrams.

FIG. 8 is a fragmentary posterior view of a generic electronic device with parts broken away and outfitted with the glove construction according to the present invention to show non-parallel finger-receiving axes defined by the finger-receiving sleeves.

FIG. 9 is an edge view of a generic electronic device outfitted with a first set of fastening structures.

FIG. 9(a) is an enlarged, fragmentary sectional view as sectioned from FIG. 9 to show in more detail the fasteners at a device-to-surface junction site.

DETAILED DESCRIPTION OF THE PREFERRED EMBODIMENT

Figure 1:
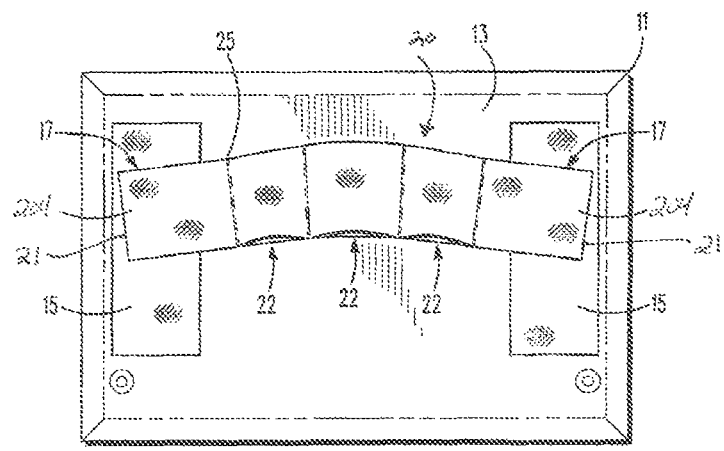
FIG. 1 is a posterior view of a notebook computer outfitted with the glove construction according to the present invention.
Figure 2:
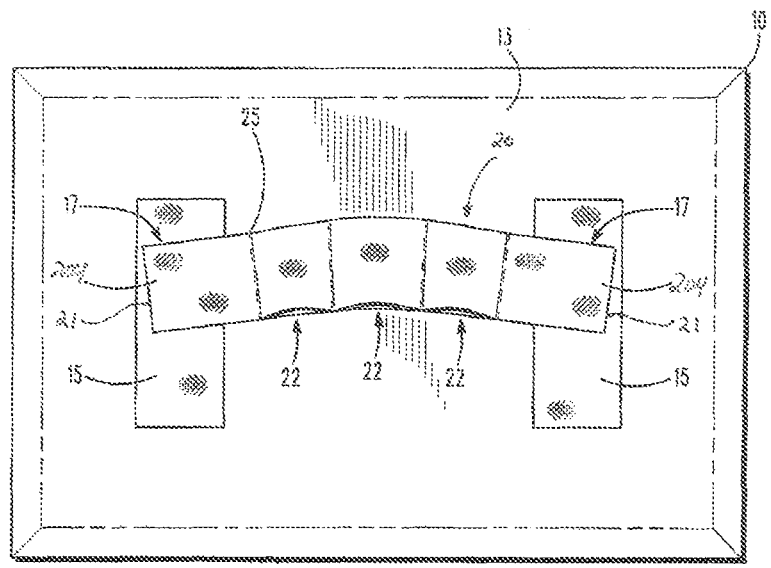
FIG. 2 is a posterior view of a laptop computer outfitted with the glove construction according to the present invention.
Figure 3:
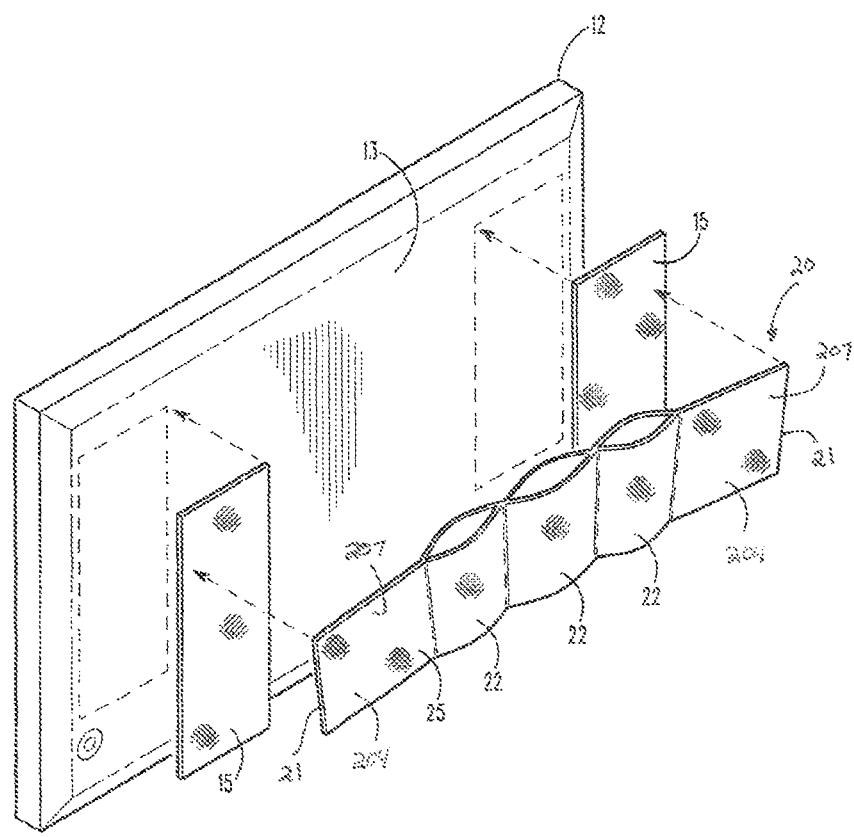
FIG. 3 is a top rear perspective view of a generic electronic device with the glove construction according to the present invention exploded therefrom.
Figure 4:
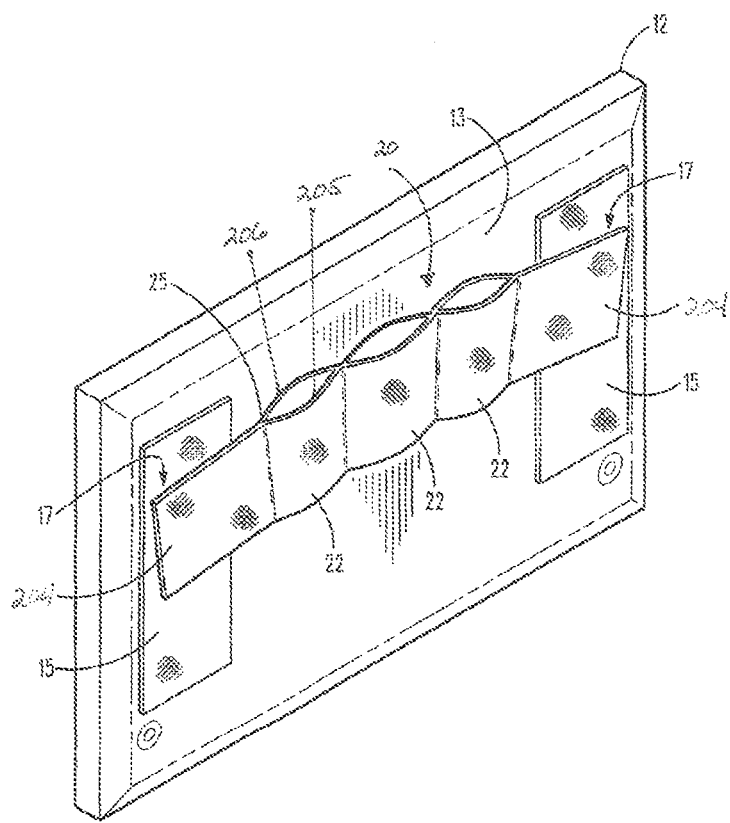
FIG. 4 is a top rear perspective view of a generic electronic device with the glove construction according to the present invention outfitted thereupon.
Figure 5:
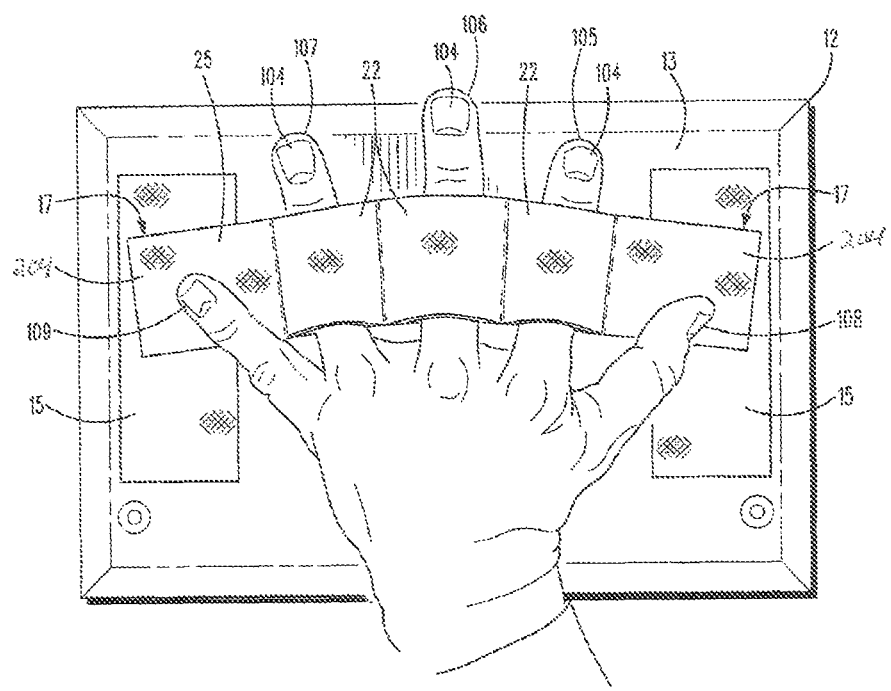
FIG. 5 is a posterior view of a generic electronic device outfitted with the glove construction according to the present invention shown with a user's index finger, a user's middle finger, and a user's ring finger received in the finger-receiving sleeves of the glove construction.

Referring now the drawings with more specificity, the present invention essentially defines a glove construction 20 usable in combination with an electronic device such as, but not limited to, a laptop computer as at 10, a notebook computer as at 11, a tablet computer, an e-reader device, or other similar electronic device (all as generically and generally referenced at 12) essentially comprising at least one (planar) surface as at 13 (for (adhesively 103) attaching certain first fastening means thereto), and having a general device weight as at vector arrow 100.

The glove construction 20 according to the present invention is preferably constructed from a flexible, load-bearing material member 25 such as nylon webbing or strapping having a general glove length as at 101 and a general glove width as at 102. The glove length 101 extends intermediate opposed glove ends as at 21. The glove construction 20 preferably and essentially comprises a series of finger-receiving sleeves 22, which sleeves 22 extend widthwise intermediate the glove length 101.

The glove construction 12 may be formed by folding a pre-formed, elongate material member (substantially twice the glove or material member length 101) in half, and stitching (as at 30) together the opposed halves widthwise to form the finger-receiving sleeves 22. A set of fastening structures may then be (stitchedly) attached to the material member ends 21 to essentially form multi-layered, stitch-closed material member ends 21.

Certain first and second matable fastening means preferably fasten the glove construction 20 to the electronic device 12. The first and second matable fastening means may be exemplified by VELCRO® brand hook and loop type fastening material. In this regard, the hook type fastening material is generally referenced at 14 and the loop type fastening material is generally referenced at 15 in the various figures. The figures show the first fastening means as exemplified by the loop structure 15 attached to the surface 13 via adhesive 103 and a loop-anchored substrate 16.

The second fastening means, as exemplified by hook type fastening structure 14 is attached to the glove ends 21 for removably mating the glove ends to the first fastening means. The matable fastening junction sites 17 must each be of sufficient strength to hold (half of) the weight 100 of the electronic device 12 for enabling the user to manually carry the electronic device 12 via the insertion of a series of fingers 104 into the finger-receiving sleeves 22.

In other words, the first and second fastening means are matable and together form a fastener interface as at sites 17 for removably attaching the glove construction 20 to the electronic device 12. The glove construction 12 and the fastener interface as at sites 17 are supportable of the computer weight 100. The device—glove combination thus enables the user to manually carry the electronic device 12 via the glove construction 12 by inserting a series of fingers 104 into the finger-receiving sleeves 22 and lifting the device-glove combination therewith.

The weight of the electronic device 12 has been diagrammatically demonstrated via the vector arrow 100 in FIG. 7 having length X and a downward direction. Vector arrows A, B, and C have an upward direction and each has an equal length one third that of length X. Vectors A, B, and C, when increased in magnitude enable the user to move the device 12 according to classical physical principles. Vectors D both have an upward direction and Vectors E both have a downward direction. Vectors D and E have an equal length but opposite direction and are included in the diagram to show basic static force diagrams at the junction sites 17.

As may be understood from an inspection of the figures attendant to these specifications, the glove construction according to the present invention preferably comprises three finger-receiving sleeves 22 for receiving a user's index finger 105, a user's middle finger 106, and a user's ring finger 107. The glove ends 21 thus preferably function to interface intermediate a user's thumb 108 and a user's small finger 109.

The finger-receiving sleeves 22 of the love construction 20 further each preferably define a finger-receiving axis as at 110, 111, and 112 as depicted and referenced in FIG. 8. The finger-receiving axes 110, 111, and 112 are preferably non-parallel as generally depicted for ergonomic enhancement. In other words, it is contemplated that the user's most comfortable hand configuration for carrying the electronic device may be that of spread fingers 104. Spread fingers 104 necessarily have non-parallel finger axes coaxial with the axes 110, 111, and 112.

When the glove construction 20, outfitted with the second fastening means, is removed from the first fastening means, it is contemplated that the remaining adhesively attached first (loop type) fastening means may provide non-abrasive padding means 18 when the electronic device 12 is placed upon a support surface 115. In this regard, the electronic device 12 further preferably comprises opposed device ends as at 19, and the first fastening means are preferably positioned adjacent the opposed device ends 19 at the surface 13 for maximizing device stability when placed upon the support surface 115.

While the above description contains much specificity, this specificity should not be construed as limitations on the scope of the invention, but rather as an exemplification of the invention. For example, it is contemplated that the present invention essentially provides a glove construction 12 for enabling a user to carry an electronic device 12, which glove construction essentially comprises a flexible, load-bearing material member 25, and certain fastening structures or means.

The load-bearing material member 25 has a material length 101 and a material width 102, which length extends intermediate opposed material member ends 21. The band or strap-like material member 25 comprises a series of finger-receiving sleeves 22 that extend widthwise (in the direction of the width 102) intermediate the material length 101. The fastening structures preferably number four, and thus include first, second, third and fourth fastening structures, as exemplified by a pair of hook type structures and a pair of loop type structures.

The first and second fastening structures are spatially separable and (adhesively) attachable to an electronic device 12. The third and fourth fastening structures are attached to the material member ends 21. The first and second fastening structures are matable with the third and fourth fastening structures. The material member and fastening structures are supportable of the electronic device for enabling the user to manually carry the electronic device via the material member by inserting a series of fingers 104 into the finger-receiving sleeves 22 and lifting the electronic device therewith.

The present invention further contemplates a glove kit comprising the load-bearing strap-like material member and fastening structures as heretofore specified. When provided in kit form, the user may then readily outfit the electronic device as deemed necessary. The present invention thus contemplates a glove kit or device-glove combination for enabling a user to carry an electronic device via an integrally formed glove construction as at 25.

The device-glove combination or kit according to the present invention is believed to preferably and essentially comprise the integrally formed glove construction 20, which integrally formed glove construction 20 is preferably formed or constructed from a flexible, load-bearing material construction as at 25 and has a glove length extending in a first dimension as at 101 and a glove width extending in a second dimension as at 102. The glove length 101 extends intermediate opposed glove ends as at 21.

The integrally formed glove construction 20 preferably comprises a first finger-receiving sleeve as at 201, a second finger-receiving sleeve as at 202, and a third finger-receiving sleeve as at 203. The glove construction 20 further preferably comprises opposed, substantially planar material end portions as at 204.

The first, second, and third finger-receiving sleeves 201, 202, and 203 are preferably centrally located intermediate the material end portions 204 and extend widthwise intermediate the glove length 101. The first, second, and third finger-receiving sleeves 201, 202, and 203 each have an upper sleeve portion as at 205, a lower sleeve portion as at 206, a sleeve plane 300 extending in the glove length and glove width dimensions as generally depicted and referenced in FIGS. 6A and 7A, and a sleeve axis as at 110, 111, and 112.

The first, second, and third finger-receiving sleeves 201, 202, and 203 each preferably comprise a sleeve width as at either 208 or 209. The sleeve widths of the first and third finger-receiving sleeves 201 and 203 are preferably substantially the same as referenced at 208, and the sleeve width (as at 209) of the second finger-receiving sleeve 202 is preferably greater than the sleeve width 208 of the first and third finger-receiving sleeves 201 and 203. The varied sleeve widths 208 and 209 are for ergonomic enhancement.

As perhaps most clearly seen in FIGS. 6A and 7, the upper and lower sleeve portions 205 and 206 together are preferably prolate spheroidal with pointed ends as at the stitch points or lines 30 in transverse cross-section. In other words, the upper and lower sleeve portions 205 and 206 are each parabolic in transverse cross-section such that inner sleeve surfacing 303 of each respective opposing upper and lower sleeve portion 205 and 206 opposite the sleeve plane 300 is concave and symmetrical about the sleeve plane 300.

The first sleeve 201 is joined to the second sleeve 202 at a first sleeve-to-sleeve junction 301 and the third sleeve 203 is joined to the second sleeve 202 at a second sleeve-to-sleeve junction 302. The first and second sleeve-to-sleeve junctions 301 and 302 each comprise an adjustable upper exterior angle as at 304 and an adjustable lower exterior angle as at 305.

Comparatively referencing FIGS. 6A versus 7A, the reader will note that the upper exterior angles 304 are equal to the lower exterior angles 305 when the material end portions 204 are coplanar with the sleeve planes 300 in a first, fingerless position as depicted in FIG. 6A. The upper exterior angles 304 are preferably greater than the lower exterior angles 305 when in a (finger-received) device-support position as generally depicted in FIG. 7A.

Figure 7A:
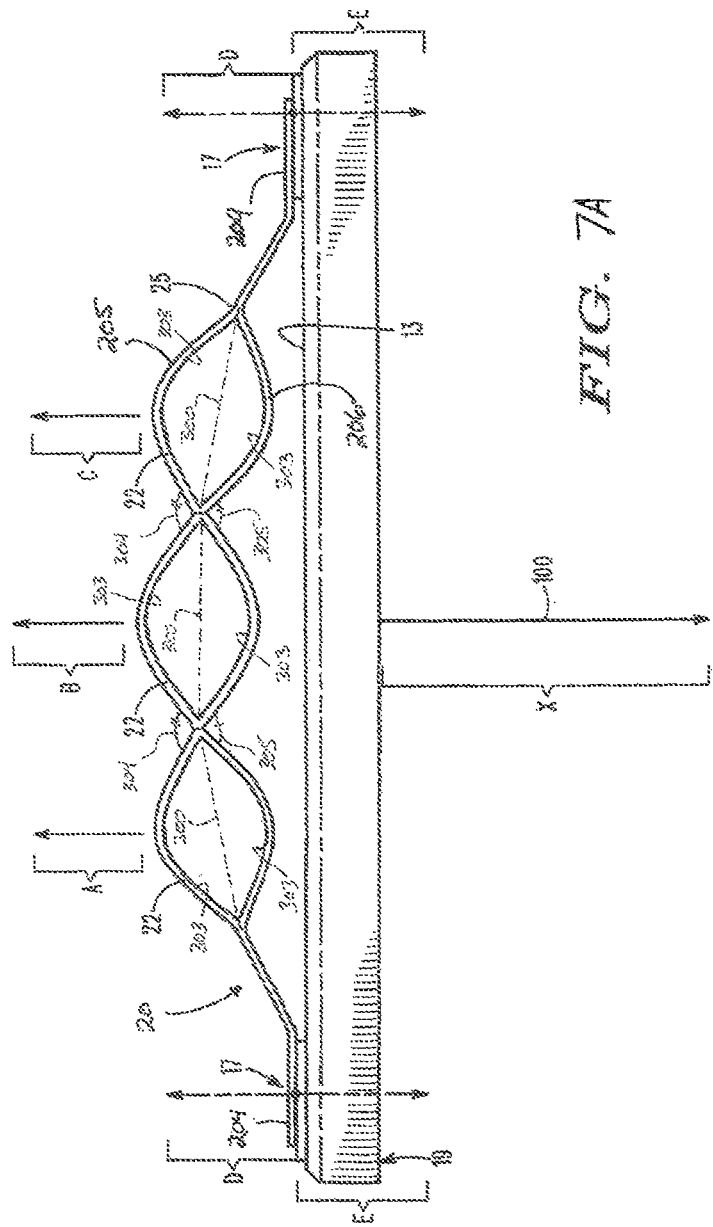
FIG. 7A is a diagrammatic edge view type depiction of the structures otherwise depicted in FIG. 7 with the user's fingers removed for greater clarity of understanding.
Figure 10:
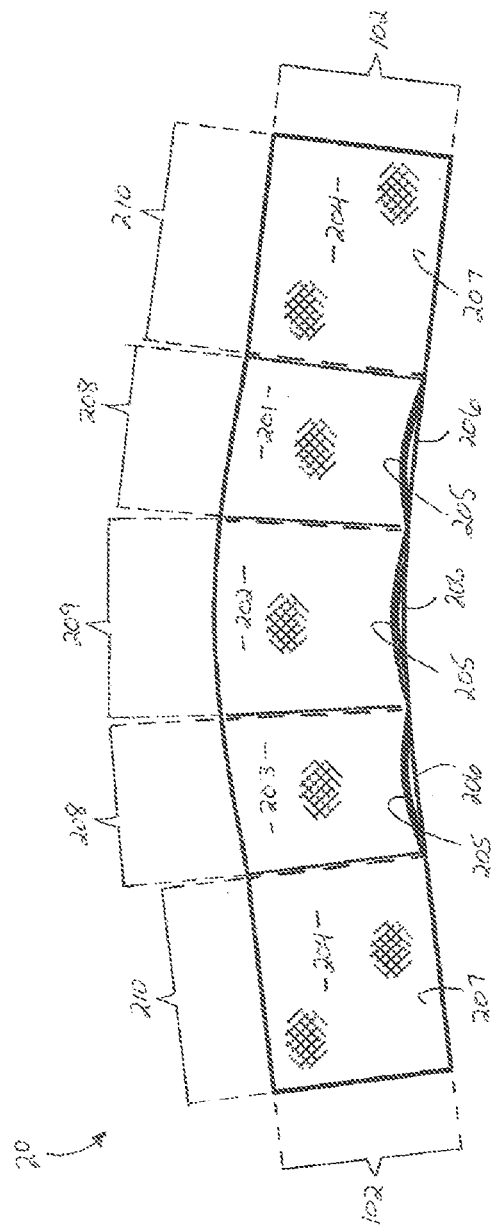
FIG. 10 is an enlarged top plan view of the glove construction according to the present invention, enlarged to highlight certain geometric relationships between the different elements of the glove construction.

The sleeve axes 110, 111, and 112 are preferably non-parallel as depicted in FIG. 8 for ergonomically receiving and positioning a user's spread ring, middle, and index fingers as at 104A, 104B, and 104C, respectively, in FIG. 7. This non-parallel arrangement operates in cooperation with the non-planar sleeve plane arrangement in FIG. 7A to enhance the device-support position there depicted.

The opposed material end portions 204 extend from the first and third finger-receiving sleeves 201 and 203 and each preferably comprise an end portion length as at 210. The end portion lengths 210 are preferably equal to one another and greater than the glove width 102 for providing an upper glove contact surface (as at 207) for a user's thumb 108 and small finger 109 in lateral adjacency to the user's index and ring fingers 104A and 104C as received in the integrally formed glove construction 20.

The first fastening means as exemplified hereinabove are preferably spaced and attached to the glove-attachable surface as at 13. The second fastening means as exemplified hereinabove are preferably attached to the opposed glove ends as at 21. The first and second fastening means are matable and together form a fastener interface for removably attaching the integrally formed glove construction 10 to the electronic device as at 10 or 11.

The integrally formed glove construction 20 and the fastener interface are supportable of the device weight, and the integrally formed glove construction 20 thus enables the user to manually carry the electronic device via the integrally formed glove construction by inserting a series of fingers (i.e. index, middle, and ring fingers as at 104A, 104B, and 104C, respectively) into the first, second, and third finger-receiving sleeves 201, 202, and 203, respectively, and simultaneously pressing the user's thumb as at 108, the user's small finger as at 109 against the upper glove contact surface 207 at the material end portions 204 and lifting or supporting the electronic device therewith.

Accordingly, although the invention has been described by reference to certain preferred embodiments, it is not intended that the novel glove construction herein presented be limited thereby, but that modifications thereof are intended to be included as falling within the broad scope and spirit of the foregoing disclosure, the following claims and the appended drawings.

We claim:

1. A device-glove combination for enabling a user to carry an electronic device via a glove construction, the device-glove combination comprising:

an electronic device, the electronic device comprising a glove-attachable surface and having a device weight;

an integrally formed glove construction, the integrally formed glove construction being constructed from a flexible, load-bearing material and having a glove length dimension and a glove width dimension, the glove length dimension extending intermediate opposed glove ends, the integrally formed glove construction comprising a first, a second, and a third finger-receiving sleeve and opposed, substantially planar material end portions, the first, second, and third finger-receiving sleeves being centrally located intermediate the material end portions and extending widthwise intermediate the glove length dimension, the first, second, and third finger-receiving sleeves each having an upper sleeve portion, a lower sleeve portion, a sleeve plane extending in the glove length and glove width dimensions, and a sleeve axis, the upper and lower sleeve portions each being parabolic in transverse cross-section such that inner sleeve surfacing of each respective opposing upper and lower sleeve portion opposite the sleeve plane is concave and symmetrical about the sleeve plane, the first sleeve being joined to the second sleeve at a first sleeve-to-sleeve junction and the third sleeve being joined to the second sleeve at a second sleeve-to-sleeve junction, the first and second sleeve-to-sleeve junctions each comprising an adjustable upper exterior angle and an adjustable lower exterior angle, the upper exterior angles being equal to the lower exterior angles when the material end portions are coplanar with the sleeve planes in a first, fingerless position, the upper exterior angles being greater than the lower exterior angles when in a device-support position, the sleeve axes being non-parallel for ergonomically receiving and positioning a user's spread index, middle, and ring fingers, the opposed material end portions extending from the first and third finger-receiving sleeves and each comprising an end portion length, the end portion lengths being greater than the glove width for providing an upper glove contact surface for a user's thumb and small finger in lateral adjacency to the user's index and ring fingers as received in the integrally formed glove construction;

first fastening means being spaced and attached to the glove-attachable surface; and second fastening means attached to the opposed glove ends, the first and second fastening means being matable and together forming a fastener interface for removably attaching the integrally formed glove construction to the electronic device, the integrally formed glove construction and the fastener interface being supportable of the device weight, the device-glove combination thus for enabling the user to manually carry the electronic device via the integrally formed glove construction by inserting a series of fingers into the first, second, and third finger-receiving sleeves and pressing a thumb and small finger against the upper glove contact surface at the material end portions and lifting the device-glove combination therewith.

2. The device-glove combination of claim 1 wherein the finger-receiving sleeves are formed by fastening opposed sections of the flexible, load-bearing material together widthwise at the first and second sleeve-to-sleeve junctions, the integrally formed glove construction thus comprising a double-layered material construction for enhancing the load-bearing characteristics thereof.

3. The device-glove combination of claim 1 wherein the first, second, and third finger-receiving sleeves each comprise a sleeve width, the sleeve width of the first and third finger-receiving sleeves being substantially the same, the sleeve width of the second finger-receiving sleeve being greater than the sleeve width of the first and third finger-receiving sleeves, the varied sleeve widths for ergonomic enhancement.

4. The device-glove combination of claim 1 wherein the first fastening means are loop type fastening means and the second fastening means are hook type fastening means.

5. The device-glove combination of claim 4 wherein the loop type fastening means provide non-abrasive padding means when the integrally formed glove construction is removed therefrom and the electronic device with first fastening means are placed upon a support surface.

6. The device-glove combination of claim 5 wherein the electronic device comprises opposed device ends, the first fastening means being positioned adjacent the opposed device ends at the glove-attachable surface for maximizing computer stability when placed upon the support surface.

7. An integrally formed glove construction for enabling a user to carry an electronic device, the integrally formed glove construction comprising:

a flexible, load-bearing material construction, the material construction having a material length and a material width, the material length extending intermediate opposed, substantially planar material end portions, the material construction comprising first, second, and third finger-receiving sleeves extending widthwise intermediate the material end portions, the first, second, and third finger-receiving sleeves each having an upper sleeve portion, a lower sleeve portion, a sleeve plane extending in dimensions of the material length and width, and a sleeve axis, the upper and lower sleeve portions each being parabolic in transverse cross-section such that inner sleeve surfacing of each respective opposing upper and lower sleeve portion opposite the sleeve plane is concave and symmetrical about the sleeve plane, the first sleeve being joined to the second sleeve at a first sleeve-to-sleeve junction and the third sleeve being joined to the second sleeve at a second sleeve-to-sleeve junction, the first and second sleeve-to-sleeve junctions each comprising an adjustable upper exterior angle and an adjustable lower exterior angle, the upper exterior angles being equal to the lower exterior angles when the material end portions are coplanar with the sleeve planes in a first, fingerless position, the upper exterior angles being greater than the lower exterior angles when in a device-support position, the sleeve axes being non-parallel for ergonomically receiving and positioning a user's spread index, middle, and ring fingers, the opposed material end portions extending from the first and third finger-receiving sleeves for providing an upper glove contact surface for a user's thumb and small finger in lateral adjacency to the user's index and ring fingers as received in the integrally formed glove construction; and first, second, third and fourth fastening structures, the first and second fastening structures being spatially separable and attachable to an electronic device, the third and fourth fastening structures being cooperable with the material end portions, the first and second fastening structures being matable with the third and fourth fastening structures, the material construction and fastening structures being supportable of the electronic device for enabling the user to manually carry the electronic device via the material construction by inserting a series of fingers into the first, second, and third finger-receiving sleeves and pressing a thumb and small finger against the upper glove contact surface at the material end portions and lifting the electronic device therewith.

8. The integrally formed glove construction of claim 7 wherein the material end portions each comprise an end portion length, the end portion lengths being greater than the glove width for maximizing the upper glove contact surface for a user's thumb and small finger in lateral adjacency to the user's index and ring fingers as received in the integrally formed glove construction.

9. The integrally formed glove construction of claim 8 wherein the finger-receiving sleeves are formed by fastening opposed sections of the material construction together widthwise at the first and second sleeve-to-sleeve junctions, the integrally formed glove construction thus comprising a double-layered material construction for enhancing the load-bearing characteristics thereof.

10. The integrally formed glove construction of claim 8 wherein the first, second, and third finger-receiving sleeves each comprise a sleeve width, the sleeve width of the first and third finger-receiving sleeves being substantially the same, the sleeve width of the second finger-receiving sleeve being greater than the sleeve width of the first and third finger-receiving sleeves, the varied sleeve widths for ergonomic enhancement.

11. The glove construction of claim 7 wherein the first and second fastening structures are loop type fastening structures and the third and fourth fastening structures are hook type fastening structures.

12. The glove construction of claim 11 wherein the loop type fastening structures provide non-abrasive padding means when the electronic device with first and second fastening structures are placed upon a support surface.

13. The glove construction of claim 12 wherein the first and second fastening structures are positioned adjacent opposed device ends of the electronic device for maximizing stability of the electronic device when said device is placed upon the support surface.

14. A glove kit for enabling a user to outfit and carry a kit-outfitted electronic device, the glove kit comprising:

a flexible, load-bearing material construction, the material construction having a material length and a material width, the material length extending intermediate opposed, substantially planar material end portions, the material construction comprising first, second, and third finger-receiving sleeves extending widthwise intermediate the material length centrally located relative to the material end portions, the first, second, and third finger-receiving sleeves each having an upper sleeve portion, a lower sleeve portion, and a sleeve plane extending in dimensions of the material length and width, the upper and lower sleeve portions each being parabolic in transverse cross-section such that inner sleeve surfacing of each respective opposing upper and lower sleeve portion opposite the sleeve plane is concave and symmetrical about the sleeve plane, the first sleeve being joined to the second sleeve at a first sleeve-to-sleeve junction and the third sleeve being joined to the second sleeve at a second sleeve-to-sleeve junction, the first and second sleeve-to-sleeve junctions each comprising an adjustable upper exterior angle and an adjustable lower exterior angle, the upper exterior angles being equal to the lower exterior angles when the material end portions are coplanar with the sleeve planes, the upper exterior angles being greater than the lower exterior angles when in a device-support position; and a series of matable fastening structures, a first set of matable fastening structures being spatially separable and attachable to an electronic device, a second set of matable fastening structures being attachable to the material end portions, the first set of fastening structures being matable with the second set of fastening structures, the material construction and matable fastening structures being supportable of the electronic device for enabling the user to manually carry the electronic device via the material construction by inserting a series of fingers into the finger-receiving sleeves and lifting the electronic device therewith.

15. The glove kit of claim 14 wherein the finger-receiving sleeves each define a finger-receiving axis, the finger-receiving axes being non-parallel for ergonomic enhancement.

16. The glove kit of claim 14 wherein the finger-receiving sleeves are formed by fastening opposed sections of the material construction together widthwise, the glove construction thus comprising a double-layered material construction for enhancing the load-bearing characteristics thereof.

17. The glove kit of claim 14 wherein the material end portions each comprise an end portion length, the end portion lengths being greater than the glove width for maximizing the upper glove contact surface for a user's thumb and small finger in lateral adjacency to the user's index and ring fingers as received in the integrally formed glove construction.

18. The glove kit of claim 14 wherein the first, second, and third finger-receiving sleeves each comprise a sleeve width, the sleeve width of the first and third finger-receiving sleeves being substantially the same, the sleeve width of the second finger-receiving sleeve being greater than the sleeve width of the first and third finger-receiving sleeves, the varied sleeve widths for ergonomic enhancement.

\* \* \* \* \*